US007346567B2

(12) United States Patent
Weeks

(10) Patent No.: US 7,346,567 B2
(45) Date of Patent: Mar. 18, 2008

(54) CONDITIONAL FEE OWNERSHIP HOME FINANCING SYSTEM AND BUSINESS METHOD

(75) Inventor: Stephen M. Weeks, Tucson, AZ (US)

(73) Assignee: REIT Contact, LLC, Tucson, AZ (US)

( * ) Notice: Subject to any disclaimer, the term of this patent is extended or adjusted under 35 U.S.C. 154(b) by 1287 days.

(21) Appl. No.: 10/064,228

(22) Filed: Jun. 21, 2002

(65) Prior Publication Data
US 2003/0236733 A1     Dec. 25, 2003

(51) Int. Cl.
*G06Q 40/00* (2006.01)
(52) U.S. Cl. ...................................................... 705/35
(58) Field of Classification Search .................. 705/10, 705/36, 35
See application file for complete search history.

(56) References Cited

U.S. PATENT DOCUMENTS

| 5,644,726 | A | 7/1997 | Oppenheimer | |
|---|---|---|---|---|
| 5,983,206 | A | 11/1999 | Oppenheimer | |
| 6,236,977 | B1 * | 5/2001 | Verba et al. | 705/10 |
| 2002/0040319 | A1 | 4/2002 | Brauer | |
| 2003/0233324 | A1 * | 12/2003 | Hammour et al. | 705/40 |

FOREIGN PATENT DOCUMENTS

| GB | 2367160 A * | 3/2002 | 705/500 |
|---|---|---|---|

OTHER PUBLICATIONS

Razzi, Elizabeth, Buying a home in a buyer's market, Apr. 1996, Kiplinger's Personal Finance Magazine, p. 64.*
National Australia Bank, Home Glossary, www.national.com.au/Personal Finance/0,,77228,00.html.*
Curry, Peter, Mortgage Contigency clauses, Long Island Business News, Sep. 4, 1995.*
Larson, Michael D., Hard money lenders: The source for last resort loans, Apr. 27, 2001, www.bankrate.com/brm/news/mtg/20000831.asp.*
Seasongood, Murray, Drastic Pledge Agreements, Harvard Law Review, Jan. 1916, vol. 29, No. 3, pp. 277-290.*
Waggoner, Lawrence, Reformulating the structure of estates, Feb. 1972, Harvard Law Review, vol. 85, Issue 4, p. 729.*
100% or Greater Financing, www.ifshomeloans.com/purchase/100-percent-or-greater-financing.html.*
Ahli Bank, Manzil Home Purchase Plans, 1997, www.iibu.com/buy_home/murabahow.htm.*

* cited by examiner

*Primary Examiner*—James P. Trammell
*Assistant Examiner*—Abdul Basit
(74) *Attorney, Agent, or Firm*—Polsinelli Shalton Flanigan Suelthaus PC

(57) ABSTRACT

A method and system for financing the purchase of real property utilizing a conditional fee simple deed. Under this method a conditional fee purchaser and a conditional remainder purchaser enter into a conditional fee agreement, delineating the rights and responsibilities of each party with regards to the purchase of a residential property. The agreement includes a determination date, at which time, the conditional remainder purchaser will either receive the entire fee simple interest in the property or will receive a lump sum payment from the conditional fee purchaser for the conditional remainder purchaser's interest in the real property. The conditional fee agreement includes a list of conditions under which the property will pass directly to the conditional remainder purchaser prior to the determination date.

34 Claims, 4 Drawing Sheets

CONDITIONAL FEE OWNERSHIP HOME FINANCING SYSTEM AND BUSINESS METHOD

FIELD OF INVENTION

The present invention relates to the financing of real property, specifically, residential housing. More particularly, the invention relates to a method of financing residential housing based on a conditional fee simple deed in order to acquire interest in the residential housing at a comparative cost savings.

BACKGROUND OF INVENTION

Home ownership has traditionally been limited to those people who are able to save enough money to provide both a down payment and cover the closing costs of the real estate transaction. A typical residential purchase requires the potential homeowner to provide at least 10% of the cost of the home as a down payment, along with these closing costs. This can make home ownership prohibitive for a large portion of the population.

Due to the prohibitive cost of purchasing a first home, a large segment of the population is deprived of the advantages of home ownership. These advantages include tax advantages, such as credits for property tax payments and interest deductions, along with intangible advantages, such as the pride of owning a home, and the ability to have a home customized to the property owner's liking.

The segment of the population that cannot afford home ownership usually ends up in a leasehold arrangement in which the landlord owns the property, and the tenant must pay rent on a regular basis. Thus, the landlord retains the advantages of owning real property, while the tenant has a place to live but none of the advantages of home ownership. Further, the landlord can raise the rent at the end of a tenancy, requiring the tenant to either pay the increased rent or find a new leasehold to rent.

It should also be noted that a conventional purchase of a fee simple interest in real property is normally financed over a long time frame, 20-30 years. However, the average homeowner moves approximately every five to seven years. Thus, the owner of a fee simple interest in real property, who wishes to move before the financing in the real property is paid in full must deal with the difficulties of finding someone to purchase their fee simple interest in order to pay off the financing company.

It is desirable to have a method for creating home ownership which allows the segment of the population, which is currently prohibited from owning a home, to be able to afford the purchase of residential real property. It is also desirable to have a mechanism by which a person can enjoy the benefits and advantages of home ownership without having to provide a large down payment. It would further be desirable to have a means of financing the purchase of a home, which would allow the home owner to subsequently move on without the difficulties of finding a purchaser for their fee simple interest.

SUMMARY OF INVENTION

The present invention relates to a conditional fee ownership home financing system (CoFOHFS) and business method. This method uses a conditional fee simple deed to acquire interest in residential real property at a significant cost savings over traditional methods of home purchases. Thus, the CoFOHFS offers home ownership at costs normally associated with renting real property The CoFOHFS business method begins when a conditional fee purchaser contacts a conditional remainder purchaser at the time the conditional fee purchaser has located a piece of real property he wishes to purchase. The conditional remainder purchaser can either approve or decline involvement in the sale, based on a number of factors. If the conditional remainder purchaser approves of the sale, a deed with conditional language is drafted, which outlines the circumstances upon which the fee simple interest will pass to either the conditional fee purchaser or the conditional remainder purchaser. The sellers' interests are not affected by the relationship between the conditional fee purchaser and the conditional remainder purchaser. From the seller's perspective, the transaction is a fee simple sale.

The conditional fee purchaser and the conditional remainder purchaser enter into a conditional fee agreement, which delineates the rights and responsibilities of each party. These rights include the requisite payments by the conditional fee purchaser and the conditional remainder purchaser to the seller, the determination date, which is the date at which the fee simple interest will vest in either the conditional fee purchaser or the conditional remainder purchaser, the conditions upon which the fee simple interest will automatically vest in the conditional remainder purchaser, and any other rights agreed upon by the parties.

Using this method, the conditional fee purchaser either finances his or her payment to seller through a financial institution, or pays cash, up front, for the conditional fee interest. If the conditional fee purchaser finances payment through a financial institution, the conditional remainder purchaser can guarantee payment on behalf of the conditional fee purchaser to the financial institution. The conditional remainder purchaser usually pays all closing costs. Thus, the conditional fee purchaser has the ability to purchase a home with limited, if any, up front costs. This ability opens the doors of home ownership to those segments of the population who previously could only afford to rent real property.

A deed containing the conditional fee language is recorded by either the seller or the escrow company after all the normal and customary residential closing requirements are met.

After closing the conditional remainder purchaser has no responsibility for the home unless or until the conditions vest fee simple in the conditional remainder purchaser. The conditional fee purchaser pays all applicable property taxes until the determination date, either individually, or through monthly impound payments. The conditional fee purchaser also pays for hazard and, if applicable, flood insurance on the property.

On the determination date, if the property has not previously transferred by operation of a condition to the conditional remainder purchaser, the conditional fee purchaser either pays the contractually agreed to amount to the conditional remainder purchaser and receives the entire fee simple interest, or the conditional fee purchaser allows the fee simple interest to pass entirely to the conditional remainder purchaser.

It should be noted that the conditional remainder purchaser, in some instances, can be the seller of the real property. In other instances, the conditional remainder purchaser could be the financial institution, which loans the conditional fee purchaser the money to pay the balance of the monies owed to seller.

The money to be paid to the conditional remainder purchaser, at the determination date, can be a price that is fixed at the time the conditional fee agreement is executed. In the alternative, the price to be paid at the determination date can be the amount of the fair market value on or about the determination date.

Advantages of this system include allowing a conditional fee purchaser to own an interest in real property that may become a fee simple interest on the determination date. Further, as long as the property appreciates in value at a high enough rate, the conditional fee purchaser will gain an equity interest in the property. This will allow the conditional fee purchaser to have all the benefits of home ownership, at costs typically associated with a leasehold interest, and without having to provide a large sum of money for a down payment and closing costs.

Advantages for the conditional remainder purchaser include the fact that he or she is equivalent to a landlord, without having any of the duties, or risks, of a landlord.

The conditional remainder purchaser has no present interest in the property, aside from a potential future ownership role that is entirely contingent upon facts outside the conditional remainder purchaser's control. On the determination date, the conditional remainder purchaser will either receive a lump sum payment for the property or the actual real property. Either way, significant returns on an investment are received by the conditional remainder purchaser. Further, by offering the CoFOHFS business method to potential homeowners, the conditional fee purchaser is chosen from the pool of potential homeowners and, therefore, increases the potential lending market for financial institutions.

A further advantage to both parties is that both the conditional fee purchaser's interests and the conditional remainder purchaser's interests are fully transferable.

Therefore, if the conditional fee purchaser wishes to move, he or she can either rent or sell his or her interest in the real property to a third party. If the conditional remainder purchaser requires cash, he or she can transfer his or her interests to an investor or other third party.

The CoFOHFS business method enables first-time homeowners to purchaser real property without large sums of money available to act as a down payment. In many instances, the first time homeowner's monthly payment to the financial institution will be similar to what the homeowner was paying in rent to a landlord. This makes homeownership available to a larger segment of the population.

DETAILED DESCRIPTION

Definitions

The terms defined below are more fully defined by reference to the specification as a whole.

A fee simple absolute is defined as an estate in which the owner is entitled to the entire property.

A leasehold is defined as an estate in realty held under a lease.

A conditional fee deed is a form of deed containing conditional language which, upon the happening of the conditional event, will divest the ownership rights of the conditional fee purchaser and vest fee simple ownership in the conditional remainder purchaser.

A conditional remainder purchaser is an entity (person or business) purchasing an estate limited to take effect and be enjoyed dependent upon, or subject to, an event or condition. It should be understood that the event or condition may never happen or be performed, therefore, creating a conditional remainder. The conditional remainder, or conditional interest can also be referred to as a qualified or defeasible fee simple.

A conditional fee purchaser is defined as an entity (person or business) purchasing a qualified fee, that is, one which is to be determined or be defeated by the happening of some contingent event or condition. Thus, if the event or condition does not happen, the conditional fee can mature into a fee simple absolute. As with a conditional remainder, the conditional fee or conditional interest can be referred to as a qualified or defeasible fee simple.

The present invention relates to a conditional fee ownership home financing system (CoFOHFS) and business method. Under this method, a conditional fee simple deed is used to acquire interest in residential real property at a significant cost savings over traditional methods of purchasing a home. This system unites individuals who wish to purchase a home but cannot afford, or do not have, a down payment for a piece of real property, with third parties who are willing to act as contingent remainder purchasers of the fee simple interests. Once the home purchaser, also known as the conditional fee purchaser, and the third party, or conditional remainder purchaser, reach an agreement with regards to a specific piece of real property, they can negotiate with the seller to reach an agreement with regards to the sales price of the real property.

Figure 1:
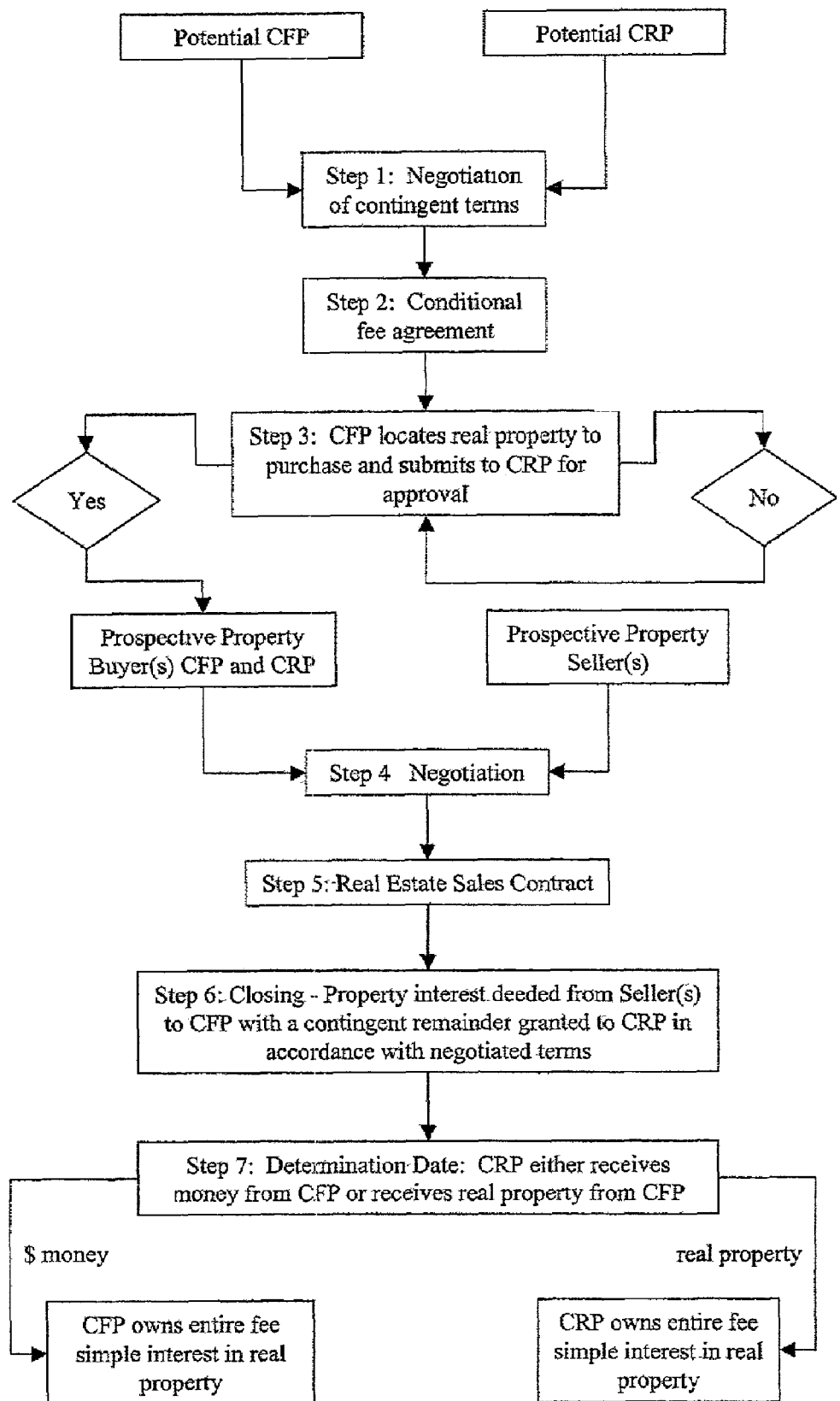
FIG. 1 is a flow chart of a CoFOHFS property sale, wherein the conditional fee purchaser (CFP) pays the seller in cash.

At the time of the sale of the real property, the conditional remainder purchaser provides the down payment and usually the closing costs for the purchase of the real property. The conditional fee purchaser provides the seller with the balance of the costs of the house, either in a lump sum cash payment, as shown in FIG. 1, or by financing a loan for the remaining balance owed on the real property, and the closing costs, if not already paid by the conditional remainder purchaser.

The use of the CoFOHFS has no effect on the seller of the real property. The seller will receive the full sales price for the real property at the time the sales contract is executed. After the sales contract is executed and all of the normal and customary residential closing requirements are met, either the seller or the escrow company will record the deed, which contains the conditional fee language agreed upon by the conditional fee purchaser and the conditional remainder purchaser. Thus, at the time of the sale, a conditional fee interest passes to both the conditional fee purchaser and the conditional remainder purchaser.

This conditional fee interest includes the same rights as a fee simple absolute. However, it further includes the possibility of the property being transferred to the conditional remainder purchaser upon the happening of a particular contingency. If the condition occurs, then the property will be transferred directly to the conditional remainder purchaser. If the condition does not occur, the property will remain under the control of the conditional fee purchaser, until the determination date. At that time, the conditional fee purchaser can pay the conditional remainder purchaser the price agreed to in the conditional fee agreement and retain the real property or the conditional fee purchaser can allow possession of the real property to pass to the conditional remainder purchaser.

The conditional fee agreement reached between the conditional fee purchaser and the conditional remainder purchaser delineates the rights and responsibilities of each party. These rights and responsibilities will normally include the conditional remainder purchaser providing the closing costs and down payment for the real property, while the conditional fee purchaser will pay the remaining balance of the monies owed on the real property to the seller. A determination date, typically five to seven years from the date of the contract, at which time the fee simple interest will vest in either the conditional fee purchaser or the conditional remainder purchaser, along with an agreement as to what sum of money the conditional fee purchaser must pay to the conditional remainder purchaser, in order to obtain a fee simple interest in the real property on the determination date, must also be included in the conditional fee agreement. The agreement will include conditions upon which the fee simple interest will automatically vest in the conditional remainder purchaser. Finally, any other rights and responsibilities, which the two parties wish to cover should be included in the agreement.

Conditions upon which the fee simple interest will automatically vest in the conditional remainder purchaser normally include:
1. Failure of the conditional fee purchaser to make a payment on the determination date of the greater of a fixed dollar amount less than the fair market value on the determination date, or a fixed dollar amount above the fair market value at the date the conditional fee agreement goes into effect;
2. The initiation of collection and/or foreclosure action by a financial institution against the conditional fee purchaser;
3. Failure of the conditional fee purchaser to pay applicable property taxes when due; and/or,
4. Failure of the conditional fee purchaser to maintain adequate hazard and, if applicable, flood insurance on the property.

The conditional fee agreement can be as simple as the conditional remainder purchaser agreeing to cover closing costs and the down payment, while the conditional fee purchaser pays the balance owed to the seller of the real property, along with a determination date, at which point, the conditional fee purchaser must pay the conditional remainder purchaser the previously agreed upon price, or give the conditional remainder purchaser a fee simple interest in the real property.

In contrast, the conditional fee agreement could be a complex document, depending upon the conditions included in the agreement which provide for the conditional remainder purchaser to receive the real property automatically, and the complexity of how the payment owed to the conditional remainder purchaser at the determination date is figured.

Figure 2:
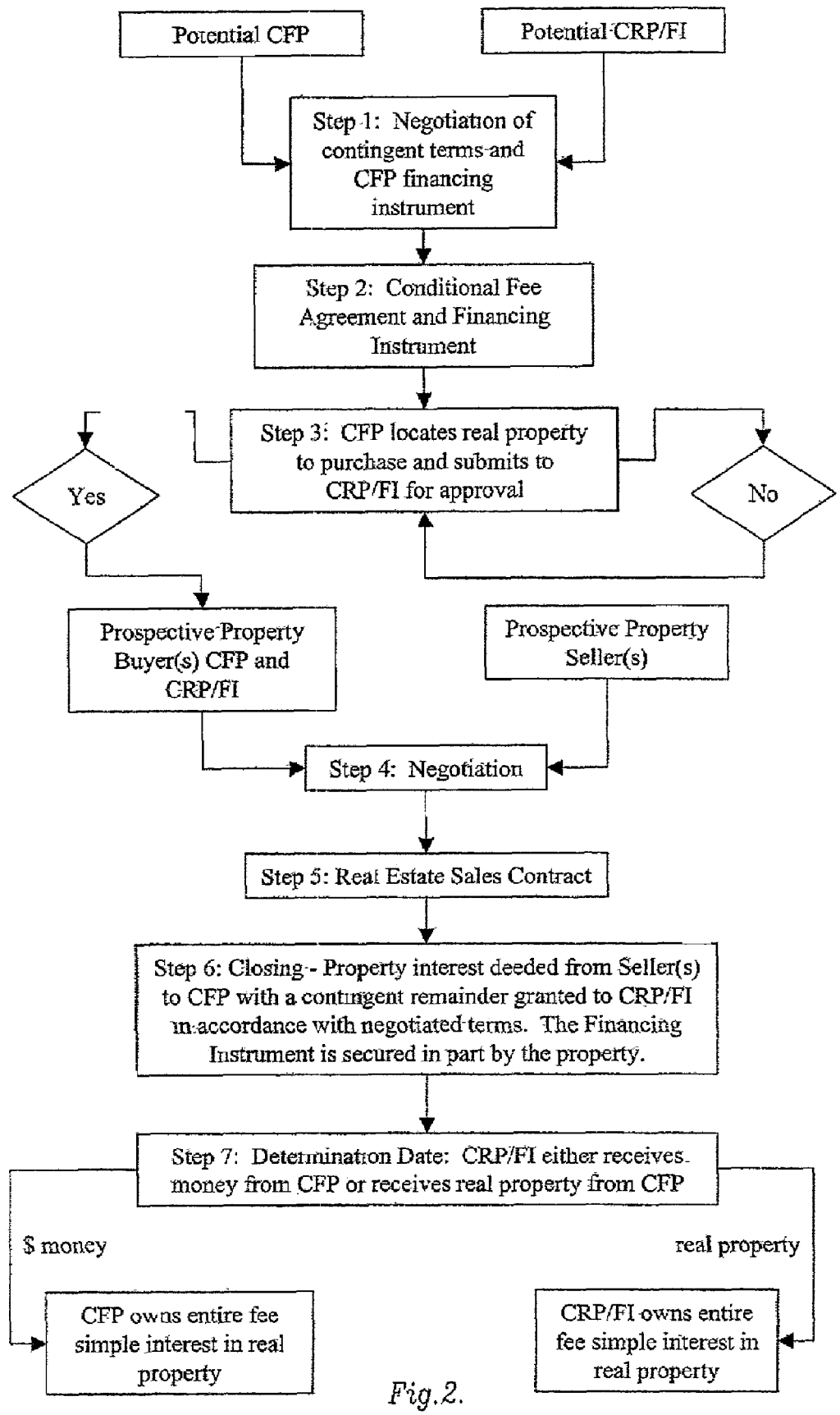
FIG. 2 is a flow chart of a CoFHFS property sale, wherein the conditional remainder purchaser (CRP) is also the financial institution (Fi) which loans money to the CFP to cover the CFP's payment to the seller of the real property.
Figure 3:
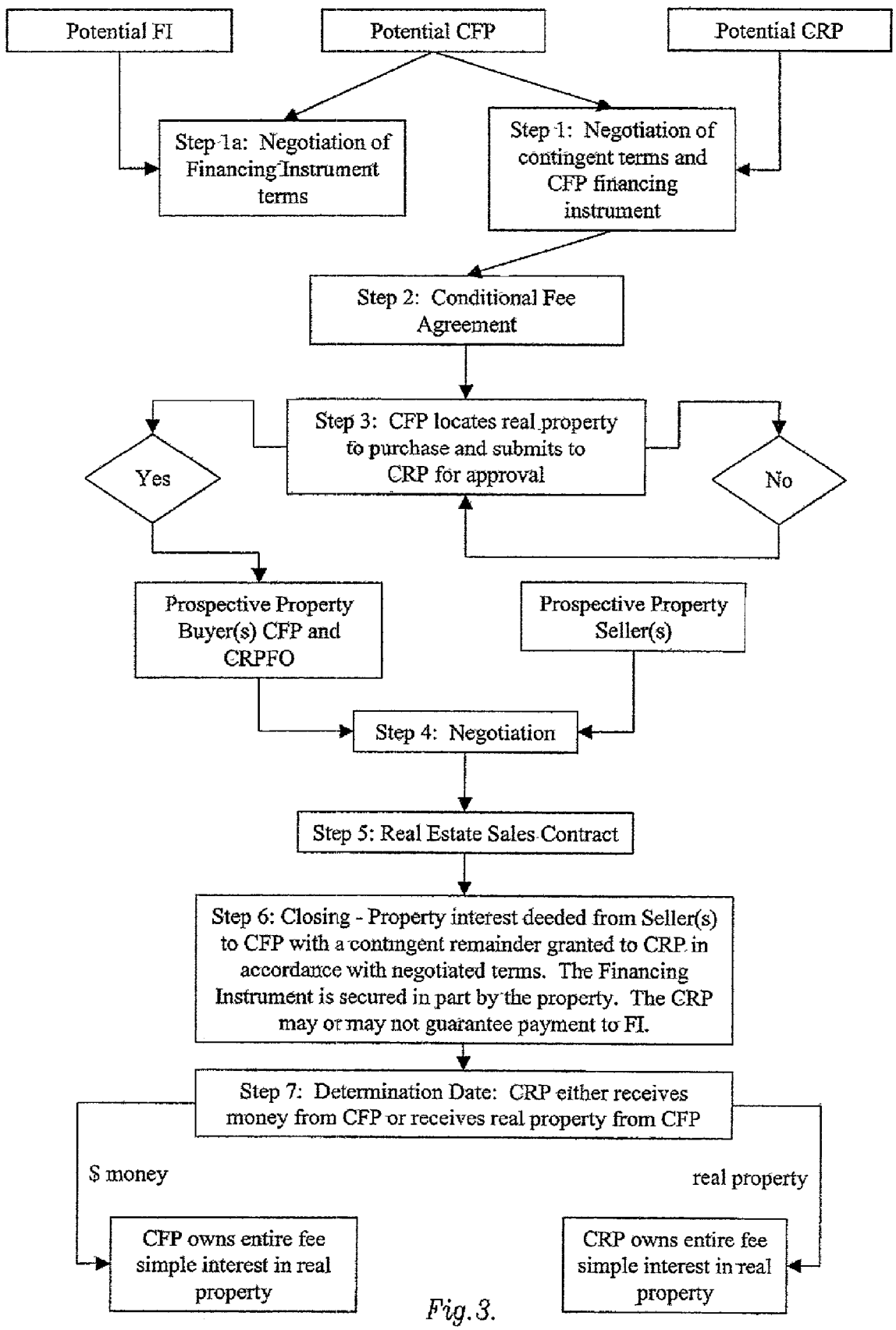
FIG. 3 is a flow chart of a CoFOHFS property sale, wherein the CFP receives a loan from a Financial Institution (FI) to pay the seller; and, FIG. 4 shows the overall structure of a computer-based system for a CoFOHFS property sale.

As previously noted, in most instances, the conditional remainder purchaser agrees to pay closing costs and the down payment for the real property. Thus, it is the conditional fee purchaser's responsibility to either pay the seller the rest of the monies due as a lump sum cash payment, or receive financing from a financial institution. In the majority of cases, the conditional remainder purchaser will be the financial institution, as shown in FIG. 3, which loans the money to the conditional fee purchaser, as shown in FIG. 2. The seller is not affected by the fact that the house is being purchased using the CoFOHFS business method.

The determination date can be any date to which the parties agree. This is the date at which the fee simple interest will vest in either the conditional fee purchaser or the conditional remainder purchaser. Although the typical period will be five to seven years it is clear that the determination date may be any date in the future to which the conditional fee purchaser and the conditional remainder purchaser agree. The reason five to seven years is preferred is that currently most homeowners change houses or relocate every five to seven years. Therefore, the CoFOHFS is set up so that the fee simple interest will vest in either the conditional fee purchaser or the conditional remainder purchaser at the same time as the conditional fee purchaser may be considering relocating.

The conditions upon which a conditional fee interest will automatically vest in the conditional remainder purchaser can be any conditions to which the two parties agree. In most instances, these conditions will include the failure of the conditional fee purchaser to make a payment on the determination date that is the greater of either a fixed dollar amount less than the fair market value of the real property on the determination date, or a fixed dollar above the fair market value of the real property at the date the conditional fee agreement goes into effect, the initiation of collection and/or foreclosure actions by the financial institution against the conditional fee purchaser, failure of the conditional fee purchaser to pay applicable property taxes when due, and failure of the conditional fee purchaser to maintain adequate hazard insurance and, if applicable, flood insurance on the home. The conditional fee purchaser and the conditional remainder purchaser can also agree to add further conditions, the occurrence of which will automatically vest the fee simple interest in the conditional remainder purchaser. Thus, the conditional fee agreement can be directly tailored to fit the requirements of the parties involved.

Once the conditional fee purchaser and the conditional remainder purchaser agree to terms for their conditional fee agreement, and a piece of real property is located, which the conditional fee purchaser wishes to purchase, and which has the approval of the conditional remainder purchaser, a sales contract can be entered into with the seller of the real property. At that point, the conditional fee purchaser can pay cash up front for his conditional fee interest, or he can finance his payment through a financial institution. Meanwhile, the conditional remainder purchaser will pay the down payment and the closing costs to the seller and, in most cases, guarantee payment on behalf of the conditional fee purchaser to the financial institution, if the conditional remainder purchaser is not, himself or herself, the financial institution financing the purchase.

Once the sales contract is executed by all parties, the seller, or the escrow company involved in the sale, will record the deed which contains the agreed conditional fee language. This will be done after all the normal and customary residential closing requirements are met. As shown, use of the CoFOHFS business method does not affect the seller. The seller still receives full payment for his real property.

After the completion of the sale of the real property, the conditional remainder purchaser has no further responsibility for the real property unless or until the conditions vest feel simple interest in the conditional remainder purchaser. At this point, the conditional remainder purchaser is the equivalent of a dutiless landlord. The conditional remainder purchaser has no present interest in the real property. The only interest the conditional remainder purchaser has in the real property is a potential future fee interest, which is entirely contingent upon factors outside the conditional remainder purchaser's control.

At the determination date, if the conditional remainder purchaser has not yet received the real property, he or she will receive a significant return on his or her investment. This return will be in the form of either a lump sum payment from the conditional fee purchaser, as agreed to in the conditional fee agreement, or a transfer of the entire interest in the real property to the conditional remainder purchaser. The rate of return on the conditional remainder purchaser's investment depends upon the rate at which the property appreciates in value during the determination period. Further, the conditional remainder purchaser's interest is fully transferable throughout the determination period. If the conditional remainder purchaser needs to raise cash, he or she can transfer or sell his or her interest to an investor or a third party. Therefore, the conditional remainder purchaser's interest is a current asset, which has current cash value and is easily liquidated.

If a condition occurs which vests the fee simple interest in the conditional remainder purchaser prior to the determination date, then the conditional remainder purchaser becomes the owner of a fee simple interest in the property. At that point, the conditional remainder purchaser will be responsible to the financial institution used by the conditional fee purchaser to finance the conditional fee purchaser's portion of the house payment. The conditional remainder purchaser will also be responsible for property taxes and insurance. Once the fee simple interest vests in the conditional remainder purchaser, he or she has all the responsibilities of ownership of the real property.

After the sale of the house is finalized, the conditional fee purchaser, for all intents and purposes, is the owner of the real property. Thus, the conditional fee purchaser has become a homeowner without having to pay closing costs or a down payment. Further, in most instances, the conditional fee purchaser's monthly payments will be less than or equal to what they would have paid if they had to finance the fee interest. These monthly payments will usually be equivalent to what the conditional fee purchaser was previously paying in rent to a landlord. Thus, for an amount of money similar to a monthly rent payment, the conditional fee purchaser can become a homeowner. The conditional fee purchaser receives all the tax advantages of home ownership. Further, if the real property purchased under a CoFOHFS appreciates in value, the conditional fee purchaser has the ability to earn equity interest in the property.

On the determination date, if the property has not previously automatically transferred by operation of a condition to the conditional remainder purchaser, the conditional fee purchaser will either pay the contractually agreed upon amount to the conditional remainder purchaser for the fee simple interest, or allow the fee simple interest to pass in its entirety to the conditional remainder purchaser.

In one embodiment of this business method, the conditional remainder purchaser and the seller are the same entity. The conditional fee purchaser and the seller/conditional remainder purchaser, agree to a purchase price for the sale of the house. At the time the sales contract is executed, the conditional fee purchaser pays the seller the purchase price agreed to, less the down payment and closing costs for the sale. In this situation, the seller will credit the conditional fee purchaser with regards to the down payment, and cover any closing costs involved in the sale.

In another embodiment of the business method, the conditional remainder purchaser (CRP) and the financial institution (Fl) used by the conditional fee purchaser (CFP) to finance the conditional fee purchaser's payment to the seller, are the same entity, as shown in FIG. 2. In this embodiment, the conditional remainder purchaser does not guarantee payment of the conditional fee purchaser's obligation to the financial institution. This embodiment represents the situation in the majority of house sales which use the CoFOHFS business method. Thus, in most instances, the conditional fee purchaser will approach a financial institution/conditional remainder purchaser and negotiate a conditional fee agreement prior to purchasing a house. This embodiment highlights the advantage of the CoFOHFS business method versus the typical home loan purchase method. In the typical home loan purchase method, the potential homeowner must have sufficient money saved to cover the down payment and closing costs at the time of approaching the financial institution. Under the CoFOHFS business method, the conditional fee purchaser approaches a financial institution without the need for having large sums of money in savings, or the ability to pay the down payment or the closing costs. Thus, under the CoFOHFS business method, the conditional fee purchaser can purchase the house with the aid of a financial institution with little or no money down.

Other embodiments are drawn to the price to be paid to the conditional remainder purchaser at the determination date. One embodiment would have a fixed price to be paid to the conditional remainder purchaser at the time the contract for the conditional fee interest is entered. Under this embodiment, both the conditional fee purchaser and the conditional remainder purchaser are speculating that the value of the real property will have increased by the determination date.

In an alternate embodiment, the price to be paid to the conditional remainder purchaser at the determination date is the amount of the fair market value of the real property on or about the determination date. The parties could also agree that the amount to be paid at the determination date would be based on the fair market value, less a certain amount of money.

Figure 4:
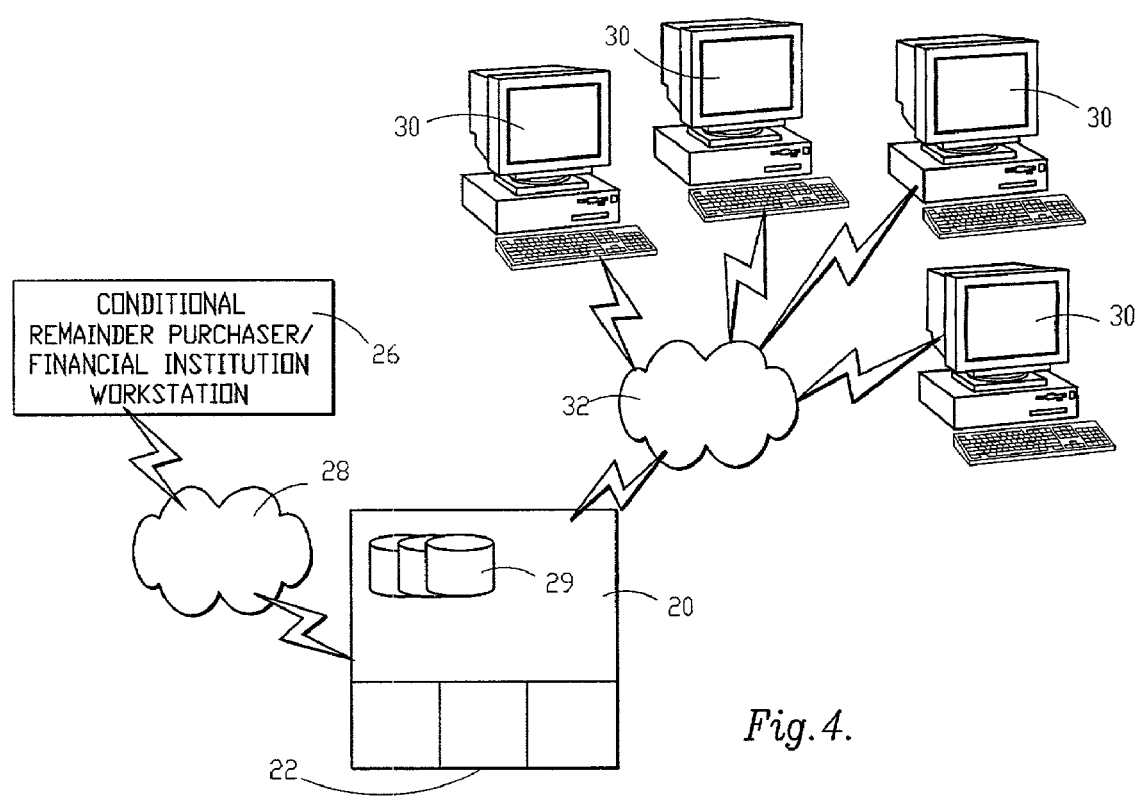

Another embodiment of this invention includes a computer-based system, as shown in FIG. 4, which illustrates a computer-based system for a conditional fee ownership home financing system and business method in accordance with the present invention. Information concerning the potential conditional fee purchaser and the conditional remainder purchaser and/or the potential financial institution can be stored, managed, and updated, at a central site 20. The central site 20 may include, for example, one or a plurality of server systems 22 (each including, for example, a processor, memory, and various peripheral devices). The central site may also include a number of databases 29 (stored on storage devices) coupled to one or more of the server systems 22.

The conditional fee remainder purchaser and/or the financial institution, may access and update the information in their data files using, for example, a conditional remainder purchaser/financial institution workstation 26 coupled to the central site 20 via a network 28. The network 28 may include, for example, a telecommunication network, a local area network, a wide area network, the Internet, etc. Of course, it is also possible that the workstations used by the conditional remainder purchaser, and/or the financial institution are directly coupled to the central site 20. The workstations 26 may be required to log-in to one of the server systems in order to access and update information on the particular entity of interest. Most likely, the entire system will be set up so that the conditional remainder purchaser and/or the financial institution will have direct access to the central site after logging into one of the server systems 22. This will allow the conditional remainder purchaser and/or the financial institution to update information in the database(s) 29 on a regular schedule.

Conditional fee purchasers may request or access information concerning potential conditional remainder purchasers, and/or financial institutions, using a conditional fee purchaser workstation 30 coupled to the central site 20 via a network 32. The network 32 may include, for example, the Internet, and conditional fee purchaser workstations 30 may be provided secure links to the central site 20 for some types of transactions, or for reviewing information with regards to the conditional remainder purchaser and/or financial institutions taking part in these transactions. Other networks, such as a telecommunications network, a local area network, a wide area network, etc., are, of course, possible. Each conditional fee purchaser workstation 30 may be required to log-in to one of the servers 22 at the central site 20 in order to access and/or update information with regards to the conditional fee purchaser.

In accordance with the present invention, data, with regards to conditional fee purchasers, conditional remainder purchasers, and financial institutions, along with minimum guidelines, with regards to potential conditional fee purchasers, can be input, for example, from the conditional remainder purchaser's workstation 26 or the financial institution's workstation 26, and stored in databases 29 at the central site 20.

Once a conditional fee purchaser approaches the conditional remainder purchaser or the financial institution, information on the conditional fee purchaser can also be input via the conditional remainder purchaser's workstation 26 and stored in the databases 29 at the central site 20.

The conditional fee purchaser and the conditional remainder purchaser can negotiate the terms of their conditional fee agreement using their respective workstations 26 and 30, which are coupled to the central site 20 via networks 28 and 32. Details of the conditional fee agreement can then be stored in the databases 29 at the central site 20.

Based on the present invention, the conditional remainder purchaser and/or the financial institution may negotiate with the conditional fee purchaser using a computer rules-based system (other systems are possible). For example, the conditional remainder purchaser can have a set of specific guidelines, which the conditional fee purchaser must meet in order for the conditional remainder purchaser to agree to participate in the conditional fee agreement. Using the rules-based system, the information the conditional fee purchaser provides to the conditional remainder purchaser through the network 32 can be compared to the guidelines (the stored rules) stored in the database 29. Thus, these steps can be performed automatically at the central site 20.

Alternatively, the guidelines, which are stored in the database 29, can be printed out by the conditional remainder purchaser, and/or the financial institution, so that the conditional remainder purchaser and/or financial institution can manually compare the information provided by the conditional fee purchaser with the guidelines to determine if the conditional fee purchaser meets the guidelines.

Once the conditional remainder purchaser and/or financial institution reviews the conditional fee purchaser's information in light of the guidelines, an indication that the conditional fee purchaser has been approved or rejected can be transmitted to the conditional fee purchaser electronically via the central site 20. Alternatively, the conditional remainder purchaser and/or the financial institution may provide the indication via the telephone or mail.

If the conditional fee purchaser meets the guidelines, as required by the conditional remainder purchaser and/or financial institution, then the conditional fee agreement can be entered into by the conditional fee purchaser and the conditional remainder purchaser, and the conditional fee purchaser and conditional remainder purchaser can proceed to contact the seller of the real property of interest to negotiate a sales contract.

EXAMPLES

Example 1

Potential Homeowner/Conditional Fee Purchaser (CFP) wishes to purchase a newly constructed, customized home from seller, for $100,000. CFP is unable to purchase the home because of the closing cost and down payment requirements. CFP contacts third party/conditional remainder purchaser (CRP) a company utilizing CoFOHFS to purchase contingent remainder interests in real property. CFP wants to enter into a conditional fee financing arrangement. CRP negotiates with CFP and they mutually agree to the following terms:

1. A determination date five-years from the date the sale closes.
2. CFP agreeing to pay CRP on the determination date the greater of
   a. $110,000 or
   b. $10,000 less than the appraised value of the property at the end of the five-year determination period.
3. CFP paying to seller $35,000 (Financed through a financial institution for a length of time no greater than the length of time for the determination date, in this case 5 years).
4. CRP paying to seller the remaining $65,000 of the $100,000 Fair Market Value (FMV).
5. CRP paying all closing costs in the transaction with seller.
6. CRP becoming fee simple owner if:
   a. CFP defaults on his obligation to financial institution before the determination date (at which point CRP assumes the liability for CFP's debt to financial institution); or
   b. CFP fails to pay the greater amount of either
      i. $110,000 or
      ii. $10,000 less than the FIMV at the determination date.

Assuming the property appreciates in excess of 2% a year, CFP will begin having psuedo-equity in the property, and, based on the above assumptions, have up to $10,000 worth of interest in the property on the determination date.

For example, if the property appreciates an average of 4% a year, the property would have a FMV of approximately $121,000 on the determination date. CFP, under the terms of the conditional agreement, would have the right to pay CRP $111,000 for a home with a value of $121,000. CFP, as a property owner, would have the right to make the $111,000 payment himself, sell the fee interest to a third party for up to $121,000, paying $111,000 to CRP and keep any profit (as long as the amount paid to CRP is calculated in accordance with the terms of the conditions) or allow the fee simple interest to pass in its entirety to the conditional remainder purchaser.

During the course of the determination period, CFP is just like any other fee simple owner, paying property taxes (probably escrowed out from monthly payments if financed), and interest on the note. In all likelihood, unless IRS rules change, CFP would be able to take advantage of tax credits typically unavailable to a tenant, but available to a homeowner as CFP is the owner of the fee interest that is merely subject to conditions.

Additionally, the monthly payment compared to standard fee purchasing is likely less than a conventional financing structure. For example, a loan payment with escrowed property taxes, hazard insurance and Mortgage insurance (MIP) on a $100,000 fee simple purchase would be close to $1,000 per month, the five year financing of $35,000 plus taxes and hazard insurance (no MIP if CRP guarantees payment), would result in a payment between $850-$900 a 10-15% discount over conventional purchasing.

During the course of the determination period, CRP is only passively involved and has no current ownership interest aside from the conditional remainder interest. CRP does not face liability for any hazards on the property during the time its interest is merely contingent, as CRP does not have any control over whether or not the fee interest will vest in either party.

Thus, there has been shown and described a conditional fee ownership home financing system and business method. It is apparent to those skilled in the art, however, that many changes, variations, modifications, and other uses and applications for the system and business method are possible, and also such changes, variations, modifications, and other uses and applications which do not depart from the spirit and scope of the invention are deemed to be covered by the invention, which is limited only by the claims which follow.

The invention claimed is:

1. A method for financing a real estate transaction between a conditional fee purchaser and a conditional remainder purchaser, said method comprising: (a) executing a conditional fee agreement with regards to purchasing real property between said conditional fee purchaser and said conditional remainder purchaser, said conditional fee agreement having a determination date; (b) executing a real estate sales contract between said conditional fee purchaser, said conditional remainder purchaser, and a seller of a piece of real property; (c) payment by said conditional fee purchaser to the seller of the amount owed by said conditional fee purchaser under the real estate sales contract; (d) payment by said conditional remainder purchaser of closing costs and down payment for the purchase of said real property as required under the real estate sales contract; (e) recording of the deed containing conditional fee language by the seller, after all closing requirements are met; and, (f) receipt by said conditional remainder purchaser on said determination date of either a fee simple interest in said real property, or a payment for said conditional remainder purchaser's share of said fee simple interest by said conditional fee purchaser, wherein the conditional remainder purchaser receives an ownership interest in the real property only upon receipt of the fee simple interest on said determination date.

2. The method of claim 1, wherein said conditional fee agreement comprises: (a) said conditional remainder purchaser paying a down payment to the seller; (b) said conditional remainder purchaser paying closing costs for the sale of said real property; (c) said determination date when said fee simple interest will rest in either said conditional fee purchaser or said conditional remainder purchaser; and, (d) conditions upon which said fee simple interest will automatically vest in said conditional remainder purchaser, prior to said determination date.

3. The method of claim 1, wherein said conditional fee purchaser finances the payment due the seller through a financial institution and said conditional remainder purchaser guarantees said conditional fee purchaser's loan with the financial institution.

4. The method of claim 1, wherein said conditional fee purchaser pays the seller cash for said conditional fee interest in said real property.

5. The method of claim 2, wherein the conditions upon which said fee simple interest automatically vests in said conditional remainder purchaser comprise the group consisting of said conditional fee purchaser's failure to pay to conditional remainder purchaser a fixed dollar amount less than the fair market value on the determination date, said conditional fee purchaser's failure to pay to said conditional remainder purchaser a fixed dollar amount above the fair market value at the date the conditional fee agreement goes into effect on said determination date, initiating of collection actions by the financial institution against said conditional fee purchaser, initiation of foreclosure action by the financial institution against said conditional fee purchaser, said conditional fee purchaser's failure to pay property taxes on said real property, said conditional fee purchaser's failure to maintain hazard insurance on said real property, said conditional fee purchaser's failure to maintain flood insurance, if applicable, on said real property, and combinations thereof.

6. The method of claim 1, wherein said conditional remainder purchaser is the seller of said real property.

7. The method of claim 3, wherein said conditional remainder purchaser is the financial institution.

8. The method of claim 3, wherein said conditional remainder purchaser does not guarantee said conditional fee purchaser's loan with the financial institution.

9. The method of claim 8, wherein an initiation of a collection action by a financial institution does not automatically vest the fee simple interest in said conditional remainder purchaser.

10. The method of claim 8, wherein an initiation of a foreclosure action by the financial institution does not automatically vest the fee simple interest in said conditional remainder purchaser.

11. The method of claim 1, wherein the price said conditional fee purchaser is to pay said conditional remainder purchaser on said determination date is a fixed price at the time of entering said conditional fee agreement.

12. The method of claim 1, wherein the price said conditional fee purchaser is to pay said conditional remainder purchaser at said determination date is said amount of the fair market value of said real property on said determination date.

13. A method for financing a real estate transaction between a conditional fee purchaser and a conditional remainder purchaser, said method comprising: (a) storing in a computer system information relating to said conditional fee purchaser, said conditional remainder purchaser, and said real estate transaction; (b) negotiating and executing a conditional fee agreement with regards to purchasing real property between said conditional fee purchaser and said conditional remainder purchaser, said conditional fee agreement having a determination date; (c) storing information in the computer system relating to said conditional fee agreement; (d) executing a real estate sales contract between said conditional fee purchaser, said conditional remainder purchaser, and a seller of a piece of real property; (e) storing information in the computer system relating to said the piece of real property and the seller; (f) payment by said conditional fee purchaser to the seller of the amount owed by said conditional fee purchaser under the real estate sales contract; (g) payment by said conditional remainder purchaser of closing costs and down payment for the purchase of said real property as required under the real estate sales contract; (h) recording of the deed containing conditional fee language by the seller, after all closing requirements are met; and, (i) receipt by said conditional remainder purchaser on said determination date of either a fee simple interest in said real property, or a payment for said conditional remainder purchaser's share of said fee simple interest by said conditional fee purchaser, wherein the conditional remainder purchaser receives an ownership interest in the real property only upon receipt of the fee simple interest on said determination date.

14. The method of claim 13, wherein said conditional fee agreement comprises: (a) said conditional remainder purchaser paying a down payment to the seller; (b) said conditional remainder purchaser paying closing costs for the sale of said real property; (c) said determination date when said fee simple interest will rest in either said conditional fee purchaser or said conditional remainder purchaser; and, (d) conditions upon which said fee simple interest will automatically vest in said conditional remainder purchaser, prior to said determination date.

15. The method of claim 13, wherein said conditional fee purchaser finances the payment due the seller through a financial institution and said conditional remainder purchaser guarantees said conditional fee purchaser's loan with the financial institution.

16. The method of claim 14, wherein the conditions upon which said fee simple interest automatically vests in said conditional remainder purchaser comprise the group consisting of said conditional fee purchaser's failure to pay to conditional remainder purchaser a fixed dollar amount less than the fair market value on the determination date, said conditional fee purchaser's failure to pay to said conditional remainder purchaser a fixed dollar amount above the fair market value at the date the conditional fee agreement goes into effect on said determination date, initiating of collection actions by the financial institution against said conditional fee purchaser, initiation of foreclosure action by the financial institution against said conditional fee purchaser, said conditional fee purchaser's failure to pay property taxes on said real property, said conditional fee purchaser's failure to maintain hazard insurance on said real property, said conditional fee purchaser's failure to maintain flood insurance, if applicable, on said real property, and combinations thereof.

17. The method of claim 15, wherein said conditional remainder purchaser is the financial institution.

18. The method of claim 13, wherein the price said conditional fee purchaser is to pay said conditional remainder purchaser on said determination date is a fixed price at the time of entering said conditional fee agreement.

19. The method of claim 13, wherein the price said conditional fee purchaser is to pay said conditional remainder purchaser at said determination date is said amount of the fair market value of said real property on said determination date.

20. The method of claim 13, wherein said method further comprises storing in a computer system information relating to a financial institution used by conditional fee purchaser to finance the payment due the seller.

21. A method for investing in real property, wherein said investor is a conditional remainder purchaser, said method comprising said conditional remainder purchaser: (a) identifying a third party who wishes to purchase a piece of real property, said third party to be known as a conditional fee purchaser; (b) negotiating and executing a conditional fee agreement with said conditional fee purchaser, said conditional fee agreement having a determination date; (c) locating a piece of real property, which said conditional remainder purchaser and said conditional fee purchaser are interested in purchasing; (d) executing a real estate sales contract between said conditional remainder purchaser, said conditional fee purchaser, and a seller of said piece of real property of interest; (e) paying the seller of said piece of real property of interest a down payment and covering closing costs for the purchase of said real property, as required under the real estate sales contract and the conditional fee agreement; (f) ensuring said conditional fee purchaser pays the seller the amount owed by said conditional fee purchaser for said piece of real property under the real estate sales contract; (g) ensuring a deed containing conditional fee language agreed to in said conditional fee agreement is recorded by the seller, after all closing requirements are met; and, (h) receiving on said determination date either a fee simple interest in said real property from said conditional fee purchaser, or a payment for said conditional remainder purchaser's share of said fee simple interest by said conditional fee purchaser, wherein the conditional remainder purchaser receives an ownership interest in the real property only upon receipt of the fee simple interest on said determination date.

22. The method of claim 21, wherein said conditional fee agreement comprises (a) said conditional remainder purchaser paying a down payment to the seller; (b) said conditional remainder purchaser paying closing costs for the sale of said real property; (c) said determination date when said fee simple interest will rest in either said conditional fee purchaser or said conditional remainder purchaser; and, (d) conditions upon which said fee simple interest will automatically vest in said conditional remainder purchaser, prior to said determination date.

23. The method of claim 21, wherein said conditional fee purchaser finances the payment due the seller through a financial institution and said conditional remainder purchaser guarantees said conditional fee purchaser's loan with the financial institution.

24. The method of claim 22, wherein the conditions upon which said fee simple interest automatically vests in said conditional remainder purchaser comprise the group consisting of said conditional fee purchaser's failure to pay to conditional remainder purchaser a fixed dollar amount less than the fair market value on the determination date, said conditional fee purchaser's failure to pay to said conditional remainder purchaser a fixed dollar amount above the fair market value at the date the conditional fee agreement goes into effect on said determination date, initiating of collection actions by the financial institution against said conditional fee purchaser, initiation of foreclosure action by the financial institution against said conditional fee purchaser, said conditional fee purchaser's failure to pay property taxes on said real property, said conditional fee purchaser's failure to maintain hazard insurance on said real property, said conditional fee purchaser's failure to maintain flood insurance, if applicable, on said real property, and combinations thereof.

25. The method of claim 21, wherein said conditional remainder purchaser is the seller of said real property.

26. The method of claim 23, wherein said conditional remainder purchaser is the financial institution.

27. The method of claim 23, wherein said conditional remainder purchaser does not guarantee said conditional fee purchaser's loan with the financial institution.

28. The method of claim 27, wherein an initiation of a collection action by a financial institution does not automatically vest the fee simple interest in said conditional remainder purchaser.

29. The method of claim 27, wherein an initiation of a foreclosure action by the financial institution does not automatically vest the fee simple interest in said conditional remainder purchaser.

30. The method of claim 21, wherein the price said conditional remainder purchaser is to receive from said conditional fee purchaser on said determination date is a fixed price at the time of entering said conditional fee agreement.

31. The method of claim 21, wherein the price said conditional remainder purchaser is to receive from said conditional fee purchaser at said determination date is said amount of the fair market value of said real property on said determination date.

32. A method for purchasing real property, wherein said purchaser is a conditional fee purchaser, said method comprising said conditional fee purchaser: (a) identifying a third party who wishes to invest in real property, said third party to be known as a conditional remainder purchaser; (b) negotiating and executing a conditional fee agreement with said conditional remainder purchaser, said conditional fee agreement having a determination date; (c) locating a piece of real property, which said conditional fee purchaser and said conditional remainder purchaser are interested in purchasing; (d) executing a real estate sales contract between said conditional fee purchaser, said conditional remainder purchaser, and a seller of said piece of real property of interest; (e) paying the seller the amount owed by said conditional fee purchaser for said piece of real property under the real estate sales contract; (f) ensuring said conditional remainder purchaser pays the seller of said piece of real property of interest a down payment and covering closing costs for the purchase of said real property as required under the real estate sales contract and the conditional fee agreement; (g) ensuring a deed containing conditional fee language agreed to in said conditional fee agreement is recorded by the seller, after all closing requirements are met; and, (h) on said determination date, either giving a fee simple interest in said real property to said conditional remainder purchaser, or paying said conditional remainder purchaser for said conditional remainder purchaser's share of said fee simple interest, wherein the conditional remainder purchaser receives an ownership interest in the real property only upon receipt of the fee simple interest on said determination date.

33. The method of claim 32, wherein said conditional fee agreement comprises: (a) said conditional remainder purchaser paying a down payment to the seller; (b) said conditional remainder purchaser paying closing costs for the sale of said real property; (c) said determination date when said fee simple interest will rest in either said conditional fee purchaser or said conditional remainder purchaser; and, (d) conditions upon which said fee simple interest will automatically vest in said conditional remainder purchaser, prior to said determination date.

34. The method of claim 32, wherein said conditional fee purchaser finances the payment due the seller through a financial institution and said conditional remainder purchaser guarantees said conditional fee purchaser's loan with the financial institution.

* * * * *

UNITED STATES PATENT AND TRADEMARK OFFICE
CERTIFICATE OF CORRECTION

PATENT NO. : 7,346,567 B2
APPLICATION NO. : 10/064228
DATED : March 18, 2008
INVENTOR(S) : Stephen M. Weeks It is certified that error appears in the above-identified patent and that said Letters Patent is hereby corrected as shown below:

Column 16, last page Line 35, the following claims are added

35. The method of claim 32, wherein said conditional fee purchaser pays the seller cash for said conditional fee interest in said real property.

36. The method of claim 33, wherein the conditions upon which said fee simple interest automatically vests in said conditional remainder purchaser comprise the group consisting of said conditional fee purchaser's failure to pay to conditional remainder purchaser a fixed dollar amount less than the fair market value on the determination date, said conditional fee purchaser's failure to pay to said conditional remainder purchaser a fixed dollar amount above the fair market value at the date the conditional fee agreement goes into effect on said determination date, initiating of collection actions by the financial institution against said conditional fee purchaser, initiation of foreclosure action by the financial institution against said conditional fee purchaser, said conditional fee purchaser's failure to pay property taxes on said real property, said conditional fee purchaser's failure to maintain hazard insurance on said real property, said conditional fee purchaser's failure to maintain flood insurance, if applicable, on said real property, and combinations thereof.

37. The method of claim 34, wherein said conditional remainder purchaser does not guarantee said conditional fee purchaser's loan with the financial institution.

38. The method of claim 37, wherein an initiation of a collection action by a financial institution does not automatically vest the fee simple interest in said conditional remainder purchaser.

39. The method of claim 37, wherein an initiation of a foreclosure action by the financial institution does not automatically vest the fee simple interest in said conditional remainder purchaser.

40. The method of claim 32, wherein the price said conditional fee purchaser is to pay said conditional remainder purchaser on said determination date is a fixed price at the time of entering said conditional fee agreement.

UNITED STATES PATENT AND TRADEMARK OFFICE
CERTIFICATE OF CORRECTION

| | |
|---|---|
| PATENT NO. | : 7,346,567 B2 |
| APPLICATION NO. | : 10/064228 |
| DATED | : March 18, 2008 |
| INVENTOR(S) | : Stephen M. Weeks |

It is certified that error appears in the above-identified patent and that said Letters Patent is hereby corrected as shown below:

41. The method of claim 32, wherein the price said conditional fee purchaser is to pay said conditional remainder purchaser at said determination date is said amount of the fair market value of said real property on said determination date.

Signed and Sealed this

Fourteenth Day of April, 2009

JOHN DOLL
*Acting Director of the United States Patent and Trademark Office*